(12) United States Patent
Hirose

(10) Patent No.: US 8,681,371 B2
(45) Date of Patent: Mar. 25, 2014

(54) IMAGE FORMING APPARATUS AND IMAGE FORMING METHOD

(75) Inventor: Hideki Hirose, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 13/533,445

(22) Filed: Jun. 26, 2012

(65) Prior Publication Data

US 2013/0003084 A1    Jan. 3, 2013

(30) Foreign Application Priority Data

Jun. 30, 2011   (JP) ................. 2011-146501

(51) Int. Cl.
*G06F 15/00*    (2006.01)
*G06K 1/00*    (2006.01)

(52) U.S. Cl.
USPC .............................. 358/1.2; 358/1.1; 358/1.9

(58) Field of Classification Search
USPC ............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

FOREIGN PATENT DOCUMENTS

JP    2008-008967 A    1/2008

*Primary Examiner* — Thierry L Pham
(74) *Attorney, Agent, or Firm* — Canon USA Inc. IP Division

(57) ABSTRACT

An image forming apparatus including a formation unit for forming patch images for calibration of an output image, a detection unit disposed on a paper conveyance path and configured to detect the fixed patch images formed on paper by the formation unit, and a correction unit for performing the calibration using the patch images detected by the detection unit is provided. When the formation unit forms the patch images, the formation unit arranges the images on both sides of a medium. On the front surface of the medium, a low-density patch image is formed, and on the back surface of the medium, a high-density patch image is formed. Alternatively, a media on which the patch image is formed is discharged once, and a user turns the medium upside down and feeds the medium again such that the first and second patch image formation positions differ from each other.

7 Claims, 17 Drawing Sheets

FIG.11

FULL-COLOR CALIBRATION
  CHECK WHETHER PAPER FOR TEST PRINT
  IS SET TO SPECIFIED PAPER FEEDING
  POSITION AND PRESS [TEST PRINT] KEY

TEST PRINT

CANCEL

FIG.15

FULL-COLOR CALIBRATION

SELECT PATCH IMAGE PRINTING METHOD

◎ PRINT PATCH ON BOTH SIDES OF PAPER
(CALIBRATION IS AUTOMATICALLY PERFORMED)

◎ PRINT BY SHIFTING PATCH IMAGES
(USERS ARE REQUIRED TO FEED PAPER
IN THE MIDDLE OF OPERATION)

| OK | CANCEL |

IMAGE FORMING APPARATUS AND IMAGE FORMING METHOD

BACKGROUND OF THE INVENTION

1. Field of the Invention

The present invention relates to patch forming for measuring a density, a color value, or the like output from an image forming apparatus.

2. Description of the Related Art

Recent image forming apparatuses for forming color images have been operating as follows. First, a plurality of electrophotographic process units each having a charging device and a development device around a photosensitive member are provided side by side in an apparatus. On the surface of the photosensitive member in each process unit, a latent image is formed by forming an optical image on the surface using an exposure device emitting a laser beam, light-emitting diode (LED) light, or the like. The latent images are visualized using toner by the individual development devices, and sequentially transferred on an intermediate belt. The images are fixed on a medium and a color image is formed.

Meanwhile, further increase of the quality of the output images formed by the image forming apparatuses employing an electrophotographic method such as color printers and color copying machines have been demanded. Especially, the gradation of the density and the stability of the density influences human decision on the quality of an image.

However, if conditions of the units in the color image forming apparatuses vary according to environmental changes or long-term use of the apparatuses, the densities of the acquired images vary. Especially, in the case of color electrophotographic image forming apparatuses, a slight environmental variation causes a variation in the density, and as a result, the color balance may be lost. Accordingly, means for always keeping a constant density-gradation characteristic is to be provided. For the purpose, with respect to each color toner for printing, for example, process conditions such as several kinds of exposure amounts corresponding to absolute humidity, and development biases, a gradation correction unit such as a look-up table (LUT), or the like are provided. Based on absolute humidity measured by a temperature and humidity sensor, a corresponding process condition and an optimum value for the gradation correction are selected.

Further, in order to obtain a constant density-gradation characteristic regardless of the variations in each device, toner patches for density detection are formed using the toner of each color on the intermediate transfer member, the drums, or the like. The densities of the unfixed toner patches are detected by a sensor detecting an unfixed toner density (hereinafter, referred to as density sensor). According to the detection results, feedback is given to the process conditions such as an exposure amount and a development bias and thereby the density control is performed to acquire a stable image. Hereinafter, the density control is referred to as calibration.

However, in the density control using the density sensor, only the density of the patch formed on the intermediate transfer member or the drum is detected, and a change of the color balance caused by the transfer or fixation onto the medium performed after the density detection is not controlled. The color balance also changes due to the transfer efficiency in the transfer of the toner image onto the medium or the application of heat or pressure by the fixation processing. It is not possible to deal with the change by the calibration processing using the density sensor. Further, in the electrophotographic method, even if the density correction is performed on each color of cyan (C), magenta (M), yellow (Y), and black (K) for stabilization, the mixed color made by combining the colors tends to show deviation.

To solve the problem, some apparatuses form gradation patches of each color of cyan (C), magenta (M), yellow (Y), and black (K) or a patch of the mixed color of C, M, Y. and K on the medium. The apparatuses are provided with a sensor for detecting a density, a chromaticity, or a spectral value of the patch image on the medium after fixation of the patches. Such image forming apparatuses can form a multidimensional LUT using the read value, and perform more accurate color mixture calibration than a monochromatic one-dimensional LUT. The sensor for detecting the density, the chromaticity, or the spectral value of the fixed patch image includes color sensors and spectral sensors. A spectral sensor is described herein as an example.

The sensor (hereinafter, after-fixation sensor) for detecting a spectral value of the patch fixed on the medium is disposed on a sheet conveyance path between the fixation position and the discharge position of the sheet in the image forming apparatus. The sensor reads an output chart for gradation correction. The position of the sensor in the main scanning operation is fixed, and consequently, the patches can be added only in the sub scanning direction (the conveyance direction of paper).

Depending on the density of the patch, to read a spectral value of the patch, a length (accumulation time) longer than or equal to a certain length is to be given to the patch. For example, if a length about 17.5 mm is necessary for one patch, in a case where patch images are printed in the longitudinal direction of a medium of the A3 size, only up to 23 patches can be arranged. If the image forming apparatus supports media up to the A4 size, only up to 16 patches can be arranged in the longitudinal direction.

To perform color correction of a mixed color using the spectral sensor, patches of about 80 to 300 are to be provided. Accordingly, if only one spectral sensor is provided, to print 300 patches, even if the patches are printed in the A3 longitudinal direction, 14 sheets of the medium is to be supplied. If more spectral sensors are provided in the main scanning direction, the number of patches printable on one sheet of the medium can be increased. However, generally, the spectral sensor for measuring the spectral values of the patches is expensive, and consequently, the cost increases.

To solve the problem, the after-fixation sensor may be provided on the conveyance path in two-sided printing, and patches may be formed on both sides to decrease the number of sheets of the medium to be consumed for the calibration. However, in a case where the patches are formed at positions where the patches overlap on the front surface and back surface of the medium, the patches on the back surface may affect the density, the chromaticity of the patches, or the accuracy of the spectral value detection on the measurement side. To solve the problem, Japanese Patent Application Laid-Open No. 2008-008967 provides a technique for eliminating the show-through effects of the overlapping patches on the front surface and the back surface by forming the patches such that the patches do not overlap with each other on the front surface and the back surface, and displacing the position of the after-fixation sensor or the position of the medium being conveyed.

However, in the known technique, the mechanism of the device for displacing the after-fixation sensor or the medium in reading the patches formed on the front surface and the back surface of the medium requires cost increase. Moreover, the control of the movement of the mechanism becomes complicated. Moreover, to increase the reliability and the accuracy of the displacement of the devices, additional costs are required.

SUMMARY OF THE INVENTION

The present invention is directed to providing an apparatus equipped with a mechanism for reducing or eliminating show-through effects due to overlapping patches without an additional mechanism or complex control.

According to an aspect of the present invention, an image forming apparatus including a formation unit configured to form patch images to be used for calibration of an output image, a detection unit disposed on a paper conveyance path and configured to detect the fixed patch images formed on paper by the formation unit, and a correction unit configured to perform the calibration of the output image using the patch images detected by the detection unit is provided. In a case where the formation unit forms the patch images, the formation unit controls the arrangement of the patch images such that, after the patch image is formed on the first paper surface and the detection unit detects the patch images, the patch image formed on a second surface that is the back surface of a first paper surface, is detected by the detection unit, suppressing the show-through effects of the front and back images by forming on the second surface the patch image having a density higher than the patch image formed on the first surface.

According to another aspect of the present invention, an image forming apparatus including a formation unit configured to form patch images to be used for calibration of an output image, a detection unit disposed on a paper conveyance path and configured to detect the fixed patch images formed on paper by the formation unit, and a correction unit configured to perform the calibration of the output image using the patch images detected by the detection unit is provided. In a case where the formation unit forms the patch images, the formation unit performs control such that after the patch image is formed on the paper and discharged, a patch image different from the patch image is formed on a region where the patch image is not formed, in printable regions on the paper turn and fed.

According to yet another aspect of the present invention, when the calibration is performed using the after-fixation sensor, the show-through effects of the front and back images caused by overlapping patches can be reduced without adding a new mechanism for moving the after-fixation sensor or the medium, to the apparatus. As a result, without increasing the costs, the patches can be arranged on both sides of the medium, and the number of sheets of the medium for printing the patches can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates a displaying part to be displayed in performing calibration according to the second exemplary embodiment of the present invention.

FIG. 15 illustrates a screen for selecting a print method of a patch image according to the third exemplary embodiment of the present invention.

DESCRIPTION OF THE EMBODIMENTS

Various exemplary embodiments, features, and aspects of the invention will be described in detail below with reference to the drawings.

Figure 1:
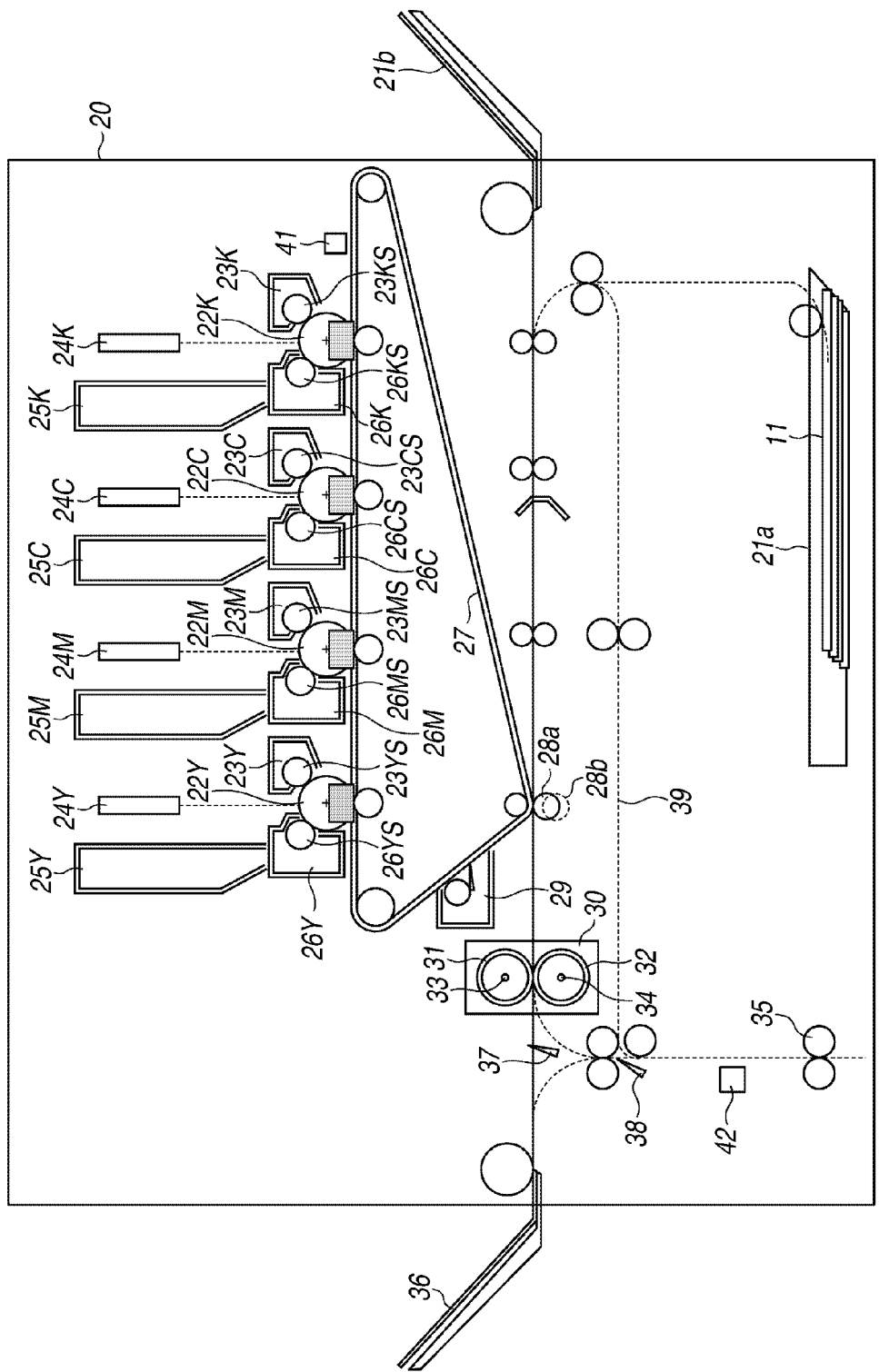
FIG. 1 is a cross-sectional view illustrating an overall configuration of an image forming unit according to an exemplary embodiment of the present invention.

The first exemplary embodiment of the present invention is described. FIG. 1 is a cross-sectional view illustrating an overall configuration of an image forming unit 20. As illustrated in FIG. 1, the apparatus is a tandem-type color image forming apparatus that employs an intermediate transfer member 27. The apparatus is an example of the electrophotographic image forming apparatuses.

Figure 3:
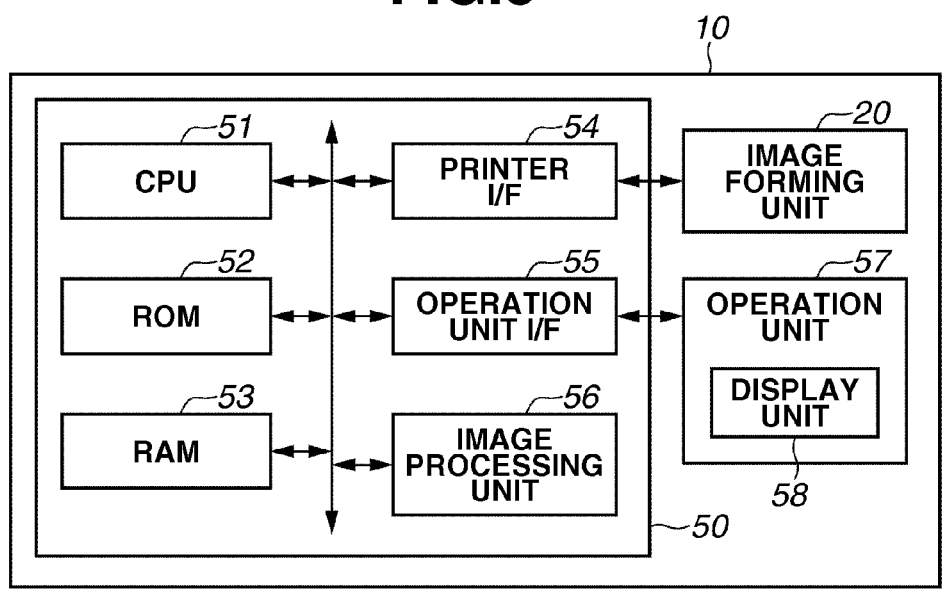
FIG. 3 is a block diagram illustrating an overall configuration of an image forming apparatus according to an exemplary embodiment of the present invention.

FIG. 3 is a block diagram illustrating a configuration of the image forming apparatus 10. The image forming apparatus 10 includes the image forming unit 20 illustrated in FIG. 1 and an image control unit 50. FIG. 3 illustrates a configuration of the image control unit 50. The image control unit 50 controls an image reading unit, the image forming unit 20, an operation unit 57, and the like illustrated in the drawing.

A central processing unit (CPU) 51 reads a control program stored in a read-only memory (ROM) 52, and executes various types of control processes such as print control. A random access memory (RAM) 53 serves as a temporary storage region for a main memory, a work area, or the like of the CPU 51. A printer interface (I/F) 54 connects the image forming unit 20 and the image control unit 50. Image data to be printed in the image forming unit 20 is transmitted from the image control unit 50 via the printer I/F 54 to the image forming unit 20, and printed on a medium in the image forming unit 20.

An operation unit I/F 55 connects the operation unit 57 and the image control unit 50. The operation unit 57 may be various types of units such as a unit having only a switch and an LED and a unit having a touch-panel liquid crystal display (LCD) unit. Information input on the operation unit 57 is transmitted to the CPU 51 via the operation unit I/F 55, and desired processing is performed. According to the processing, the information is displayed on a display unit 58 provided in the operation unit 57.

Figure 2:
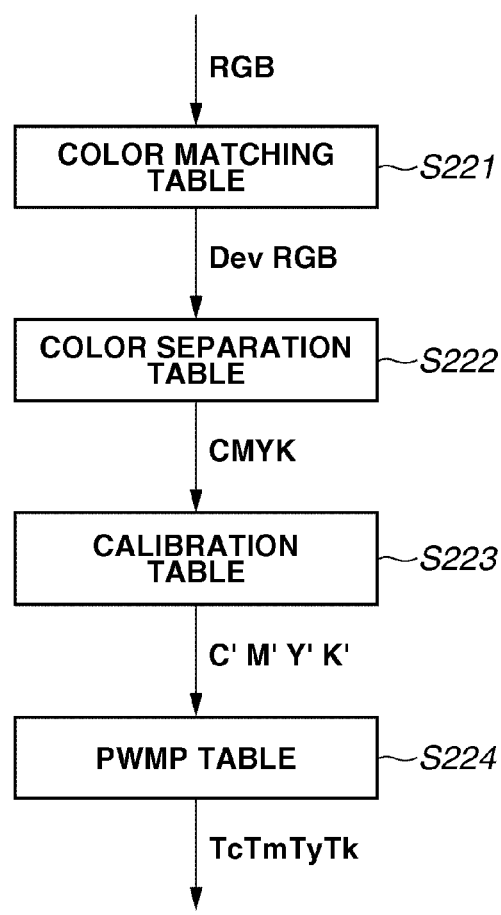
FIG. 2 is a flowchart illustrating processing performed in an image processing unit according to an exemplary embodiment of the present invention.

Processing performed in an image processing unit 56 is described. FIG. 2 illustrates an example of the processing performed in the image processing unit 56 in the image forming apparatus 10. The processing in FIG. 2 is implemented according to a program stored in the ROM 52 by the CPU 51 in the image control unit 50 controlling the hardware of the image processing unit 56. The processing in FIG. 2 may be implemented according to the program stored in the ROM 52 by the CPU 51 in the image control unit 50.

In step S221, using a color matching table that is provided in advance, the CPU 51 converts an RGB signal indicating colors of an image transmitted from a personal computer, or the like. The CPU 51 converts the signal into a device RGB signal (hereinafter, referred to as DevRGB) corresponding to a color reproduction range of the image forming apparatus 10. In step S222, using a color separation table that is provided in advance, the CPU 51 converts the DevRGB signal into a CMYK signal that indicates toner color materials of the image forming apparatus.

In step S223, using a calibration table for correcting a density-gradation characteristic unique to the image forming apparatus, the CPU 51 converts the CMYK signal into a C'M'Y'K' signal on which a correction of the density-gradation characteristic is performed. In step S224, using a pulse width modulation (PWM) table, the CPU 51 makes a conversion into exposure time Tc, Tm, Ty, and Tk of scanner units 24C, 24M, 24Y, and 24K corresponding to the C'M'Y'K' signal.

Operation of the image forming unit 20 in the electrophotographic image forming apparatus 10 is described with reference to FIG. 1. The image forming unit 20 forms electrostatic latent images using exposure light emitted in the exposure time converted by the image processing unit 56. The image forming unit 20 develops the electrostatic latent images to form homochrome toner images. The image forming unit 20 overlaps the homochrome toner images to form a multicolor image, and transfers the multicolor toner image onto a medium 11. Then, the image forming unit 20 fixes the multicolor toner image on the medium 11.

The image forming unit 20 includes a paper feed unit 21, photosensitive members 22Y to 22K, injection charging units 23Y to 23K, toner cartridges 25Y to 25K, development units 26Y to 26K, the intermediate transfer member 27, transfer rollers 28, a cleaning unit 29, a fixing unit 30, a density sensor 41, and a spectral sensor 42.

The paper feed unit 21 includes a paper cassette 21a and a manual paper feed stage 21b.

An organic photo conducting layer is applied on the outer periphery of an aluminum cylinder of the photosensitive drums (photosensitive members) 22Y to 22K. The photosensitive drum is rotated by driving force transmitted from a drive motor (not illustrated). The drive force rotates the photosensitive drums 22Y to 22K in the counterclockwise direction according to image forming operation.

As temporary charging units, four injection chargers 23Y to 23K for charging the photosensitive members of yellow (Y), magenta (M), cyan (C), and black (K) are provided respectively for each station. The individual injection chargers include sleeves 23YS to 23KS respectively.

The exposure light is emitted from the scanner units 24Y to 24K onto the photosensitive drums 22Y to 22K. By selectively emitting the light on the front surfaces of the photosensitive drums 22Y to 22K, electrostatic latent images are formed.

As development units, four development units 26Y to 26K for developing in yellow (Y), magenta (M), cyan (C), and black (K) are provided respectively for each station. The individual development units includes sleeves 26YS to 26KS respectively. Each development unit is detachably mounted.

The intermediate transfer member 27 comes in contact with the photosensitive drums 22Y to 22K. The intermediate transfer member 27 rotates in the clockwise direction in conjunction with the rotation of the photosensitive drums 22Y to 22K in image formation operation, and homochrome images are transferred. The intermediate transfer member 27 further comes in contact with the transfer rollers 28 described below to sandwich and convey the medium 11, and a multicolor toner image on the intermediate transfer member 27 is transferred on the medium 11.

The transfer rollers 28 come in contact with the medium 11 at a position 28a while the multicolor toner image is being transferred on the medium 11, and are separated to a position 28b after the print processing is completed. The fixing unit 30 fuses and fixes the transferred multicolor toner image while conveying the medium 11. As illustrated in FIG. 1, the fixing unit 30 includes a fixing roller 31 and a pressure roller 32. The fixing roller 31 heats the medium 11. The pressure roller 32 presses the medium 11 such that the medium 11 comes in contact with the fixing roller 31. The fixing roller 31 and the pressure roller 32 are formed to be hollow, and include heaters 33 and 34 in their insides respectively. In other words, onto the medium 11 on which the multicolor toner image is formed, heat and pressure are applied while being conveyed by the fixing roller 31 and the pressure roller 32, and the toner is fixed on the front surface.

The medium 11 after the toner image fixation processing is discharged onto a discharge tray (not illustrated) by a discharge roller (not illustrated), and the image forming operation ends. The cleaning unit 29 performs cleaning of the toner remaining on the intermediate transfer member 27. After the four-color multicolor toner image formed on the intermediate transfer member 27 is transferred onto the medium 11, the waste toner is stored in a cleaner container.

The density sensor 41 is disposed facing the intermediate transfer member 27 in the color image forming apparatus in FIG. 1. The density sensor 41 measures a density of a toner patch formed on the front surface of the intermediate transfer member 27.

Figure 4:
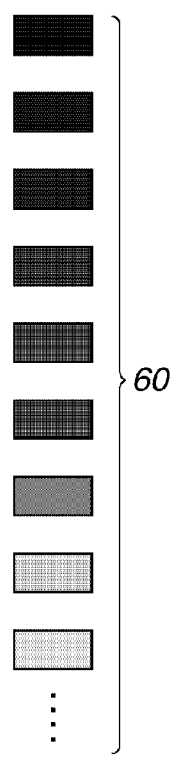
FIG. 4 illustrates patch images for density-gradation characteristic control formed on an intermediate transfer member according to an exemplary embodiment of the present invention.

FIG. 4 illustrates an example of a patch image for density-gradation characteristic control, formed on the intermediate transfer member. In FIG. 4, unfixed K toner homochrome gradation patches 60 are arranged. Sequentially, C, M, and Y toner homochrome gradation patches (not illustrated) are formed. The density sensor 41 does not identify colors of the toner on the intermediate transfer member 27. For that reason, the homochrome toner gradation patches 60 are formed on the intermediate transfer member 27. After the formation, the density data is fed back to a calibration table for correction of a density-gradation characteristic of the image processing unit and each process condition of the image forming unit 20.

The spectral sensor 42 is disposed in the downstream side of the fixing unit 30 on the sheet conveyance path (medium conveyance path) in the image forming unit 20 in FIG. 1 facing the image formation surface of the medium 11. In other words, the sensor is disposed on the conveyance path at a position from the fixation position up to the discharge position of the paper in the image forming apparatus. The sensor detects and measure a fixed color mixture patch formed on the medium 11 to acquire a spectral value.

The spectral value is calculated from a spectral reflectance acquired by measuring the patch. The value is a value in a color space which is independent from the device, for example, a density of the patch, a reflectivity, a luminance value, an L*a*b* value, or XYZ. The spectral sensor 42 arranged in the image forming apparatus 10 enables automatic patch detection of a fixed image before the discharge of the paper onto the discharge unit 36. The sensor detects and reads the color mixture patch image fixed on the medium, and this increases the color matching accuracy. Further, multicolor variation that is difficult to adjust by only a homochrome patch can be corrected.

Before the spectral sensor 42 detects and reads a color mixture patch image, the spectral sensor 42 reads a white board (not illustrated) disposed facing the sensor. By the operation, an absolute chromaticity can be calculated. After the calculation, the spectral sensor 42 reads the color mixture patch image.

The fixed patch image for density-gradation characteristic control formed on the medium 11 is read by the spectral sensor 42 in the density control. The fixed patch image may be a homochrome pattern of C, M, Y, or K, or a process gray gradation patch of mixture of C, M, and Y.

Figure 5:
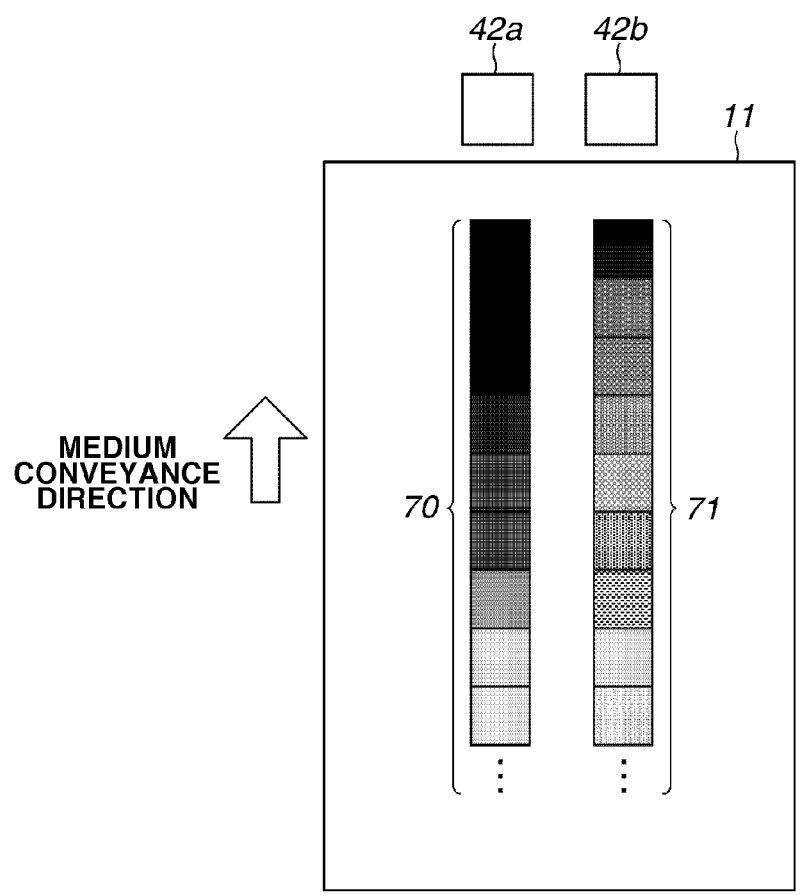
FIG. 5 illustrates patch images for density-gradation characteristic control formed on a medium according to an exemplary embodiment of the present invention.

FIG. 6 illustrates an example of the fixed patch image for density-gradation characteristic control formed on the medium 11. In the example in FIG. 6, two spectral sensors 42 are disposed in the main scanning direction. For the density-gradation characteristic control patch images, patches of mixtures of CMYK are used. In the image forming apparatus, the two spectral sensors 42a and 42b are provided. The arrangement is illustrated in FIG. 5. In FIG. 5, two lines of color mixture patches 70 and 71 are formed, and the patches are measured by the spectral sensors 42a and 42b respectively.

In a case where the color mixture patches are printed on one side of the medium 11 and discharged, after the fixing unit 30 fixes the color mixture patches, a flapper 37 provided immediately behind the fixing unit 30 operates. By the operation, the medium 11 coming out from the fixing unit 30 is conveyed in the direction of reversing rollers 35. Then, using the spectral sensors 42, spectral values of the color mixture patches are measured. The spectral sensors 42 are disposed on the two-sided conveyance path, on which the medium 11 passes through the fixing unit 30 and is discharged. Then, the leading edge of the medium 11 enters the reversing rollers 35, and the reversing rollers 35 are rotated in the reverse direction. Then, a two-sided flapper 38 is operated in the direction toward the discharge unit 36, and the medium 11 is discharged onto the discharge unit 36 as it is.

In a case where the color mixture patches are printed on both sides of the medium 11 and discharged, operation similar to that in the one-sided printing is performed until the reversing rollers 35 are rotated in the reverse direction. The two-sided flapper 38 operates toward the direction of a two-sided conveyance path 39, and the medium 11 is conveyed to the two-sided conveyance path 39.

Similarly to the transfer of the front surface, the intermediate transfer member 27 comes in contact with the transfer rollers 28 to sandwich and convey the medium 11, and a multicolor toner image on the intermediate transfer member 27 is transferred on the medium 11. After that, similarly to the operation for the front surface, the medium 11 is once conveyed in the direction of the reversing rollers 35, and measured by the spectral sensors 42. Then, the reversing rollers 35 rotate in the reverse direction and the medium 11 is discharged onto the discharge unit 36.

Figure 8:
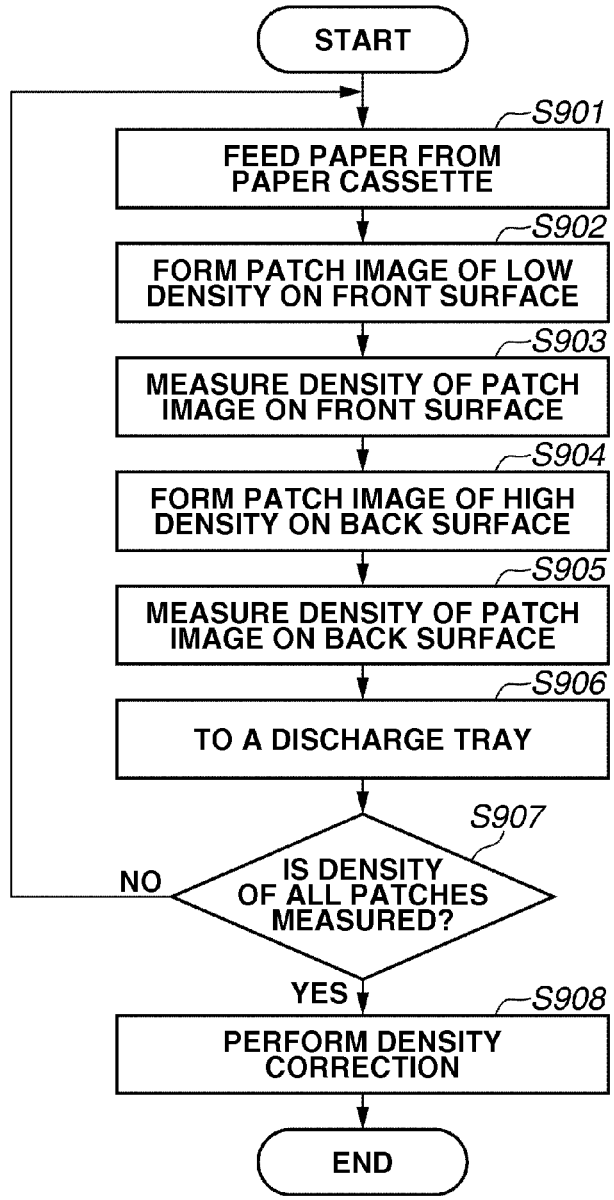
FIG. 8 is a flowchart illustrating a procedure from patch image formation to patch image measurement according to the first exemplary embodiment of the present invention.

FIG. 8 is a flowchart illustrating a flow of controlling multicolor calibration performed in the image forming apparatus having the spectral sensors according to the present exemplary embodiment. Unless specifically mentioned, the control is basically executed by the CPU 51 during intervals between normal print operations. The control is automatically executed (hereinafter, referred to as automatic calibration) at predetermined timing by detecting environmental variation, the number of sheets to be printed, or the like. Alternatively, the control can be performed by issuing an instruction to execute the processing for users at predetermined timing, or when a user wants to execute the control processing, the user can manually execute the processing (hereinafter, referred to as manual calibration). In the exemplary embodiment, a case where the automatic calibration is set is described.

In step S901, at predetermined timing of shift to calibration processing set in advance, the medium 11 is fed from the paper cassette 21a.

In step S902, a color mixture patch image to be printed on the front surface of the medium 11 is formed. At that time, on the front surface of the medium 11, a color mixture patch image of a low density is formed. The low-density color mixture patch image is a patch for eliminating the show-through effects of the front and back images when a patch image is formed on the back surface of the medium 11 later and the patch image is detected by the spectral sensor 42.

Basically, the show-through effects of the front and back images is determined by a transmissivity and a toner mounting amount of the medium 11. For example, a color mixture patch image having a density lower than or equal to a threshold determined to have a small effect in advance is selected as the patch image to be formed on the front surface of the medium 11. At this step, naturally the patch image is not formed on the back surface of the medium 11, and the medium 11 is not affected by the show-through of the front and back images at all. The patch image formed in this step is stored in the ROM 52 in the image control unit 50 in advance or may be dynamically generated by the CPU 51.

In step S903, the medium 11 is conveyed to the position the spectral sensors 42 are disposed, and the spectral sensors 42 measures a spectral value of the color mixture patch image on the front surface of the medium 11.

In the exemplary embodiment, the calibration is executed using a density value of the patch image, the value can be acquired from a spectral reflectance. Alternatively, a value calculated from the acquired spectral reflectance can be used.

In step S904, the reversing rollers 35 rotate in the reverse direction to convey the medium 11 to the two-sided conveyance path 39, and a color mixture patch is formed again on the back surface. In step S902, the patch image of the low density is formed on the front surface of the medium 11, however, in step S904, the patch image of a high density is formed. At this time, if the number of the patch images formed on the front surface of the medium 11 is the same as that formed on the back surface, the efficiency is optimum. However, if a density shows only a small effect of the above-described show-through of the front and back images, the total number of the patch images may become unequal between the front surface and the back surface.

Figure 6A:
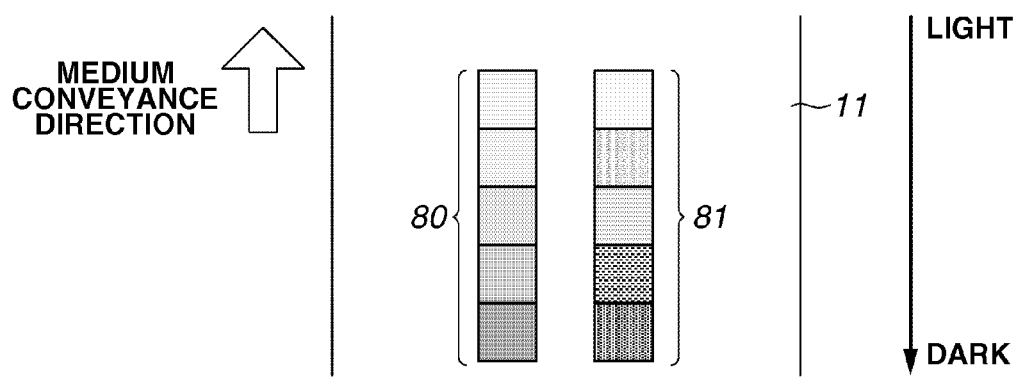
FIG. 6A illustrates patch images for density-gradation characteristic control formed on the front surface of a medium according to a first exemplary embodiment of the present invention.
Figure 6B:
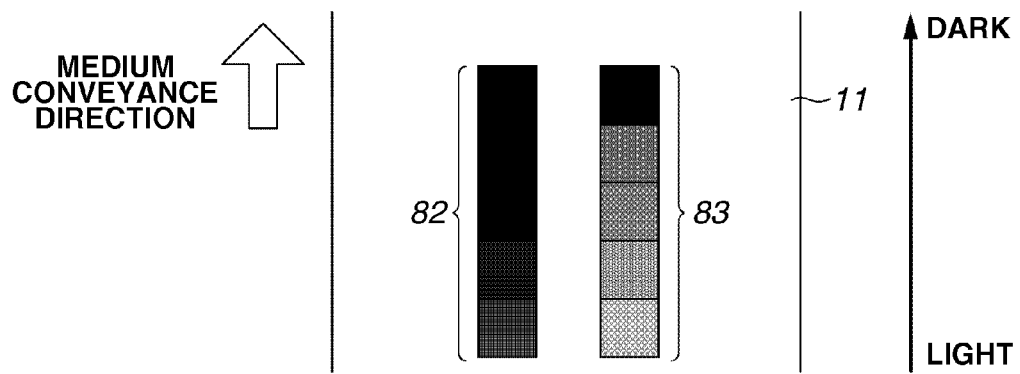
FIG. 6B illustrates patch images for density-gradation characteristic control formed on the back surface of the medium according to the first exemplary embodiment of the present invention.

FIGS. 6A and 6B illustrate examples of the patch images formed in step S902 and step S904. FIG. 6A is an example of the patch images of low density formed on the front surface of the medium 11. In the exemplary embodiment, the two spectral sensors 42 are provided in the main scanning direction, and consequently, two lines of low-density color mixture patches 80 and 81 are formed. On the front surface of the medium 11, in consideration of the show-through effects of the front and back images in measuring the patch image on the back surface, the low-density patch images are disposed. In the group of the low-density patch images, for example, the patches are arranged in the order the densities are gradually increased from a low density to a high density starting from the leading edge in the conveyance direction.

Figure 7:
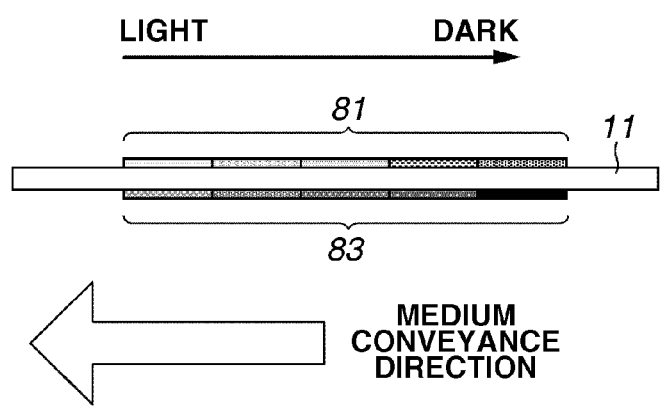
FIG. 7 is a cross-sectional view illustrating a medium after patch images for density-gradation characteristic control are formed on the both sides of the medium according to the first exemplary embodiment of the present invention.

On the other hand, FIG. 6B illustrates an example of the patch images of high density formed on the back surface of the medium 11. Similarly to the front surface, the two spectral sensors 42 are provided in the main scanning direction, and consequently, two lines of high-density color mixture patches 82 and 83 are formed. As will be understood from the two-sided conveyance path 39 in the image forming unit 20 in FIG. 1, the positions where the patch images are formed in the main scanning direction are the same also in the back surface printing. Although the high-density patch images are arranged on the back surface of the medium 11, the patches are arranged such that show-through effects of the patch images already formed on the front surface are reduced. More specifically, in the group of the high-density patches, for example, the patches are arranged such that the densities gradually shift from a high density to a low density starting from the leading edge in the conveyance direction FIG. 7 illustrates a cross-sectional view of the medium 11 when the patch images are formed on the both surfaces and discharged onto the discharge unit 36. Although the low-density patch images are formed on the front surface and the high-density patch images are formed on the back surface of the medium 11, the directions of the gradation of the density are the same in the same surface. As a result, the patch images are arranged such that the show-through effects of the front and back images is reduced in the measuring the patch images on the back surface.

In the flowchart in FIG. 8, after the patch images on the back surface of the medium 11 are transferred and pass through the fixing unit 30, the medium 11 is conveyed again to the position the spectral sensors 42 are disposed. In step S905, the spectral sensors 42 detect and measure the patch images on the back surface of the medium 11. In step S906, the reversing rollers 35 rotate in the reverse direction, and the medium 11 is discharged onto the discharge unit 36.

In step S907, if the detection and measurement of all patches are completed (YES in step S907), in step S908, the CPU 51 corrects the output image data using a calibration table for correcting the density-gradation characteristic. In step S907, if not all of the patch images are formed (NO in step S907), the processing returns to step S901 again. In step S901, the medium 11 is fed from the paper feed cassette 21a, and a similar flow is repeated.

As described above, according to the exemplary embodiment, the patch images are formed several times. In other words, the arrangement of the patches for reducing the show-through of the front and back images can be implemented by forming the patch images on the both sides, forming the low-density patch images on the front surface of the medium 11, and forming the high-density patch images on the back surface.

Thus, sensing errors due to the show-through caused by the patch images on the front surface can be reduced when the patch images on the back surface are detected and measured by the spectral sensors 42 without adding a new mechanism to the apparatus or performing complex control. Further, the number of sheets necessary for printing the patch images can be reduced.

A second exemplary embodiment of the present invention is described. In the first exemplary embodiment, by forming the low-density patch images on the front surface of the medium 11, and by forming the high-density patch images on the back surface, in measuring the patch images on the back surface by the sensors, sensing errors due to the show-through of the front and back images caused by the patch images can be reduced. In the second exemplary embodiment, a second patch image can be formed at a position different from that of a first patch image by discharging once the medium 11 on which the patch image is printed, turning the direction of the paper upside down by the user, and feeding the paper again. Consequently, different from the first exemplary embodiment, when the patch image on the back surface is measured, the problem of the show-through of the front surface patch images does not exist. Descriptions of the parts similar to those in the first exemplary embodiment are omitted.

Figure 10:
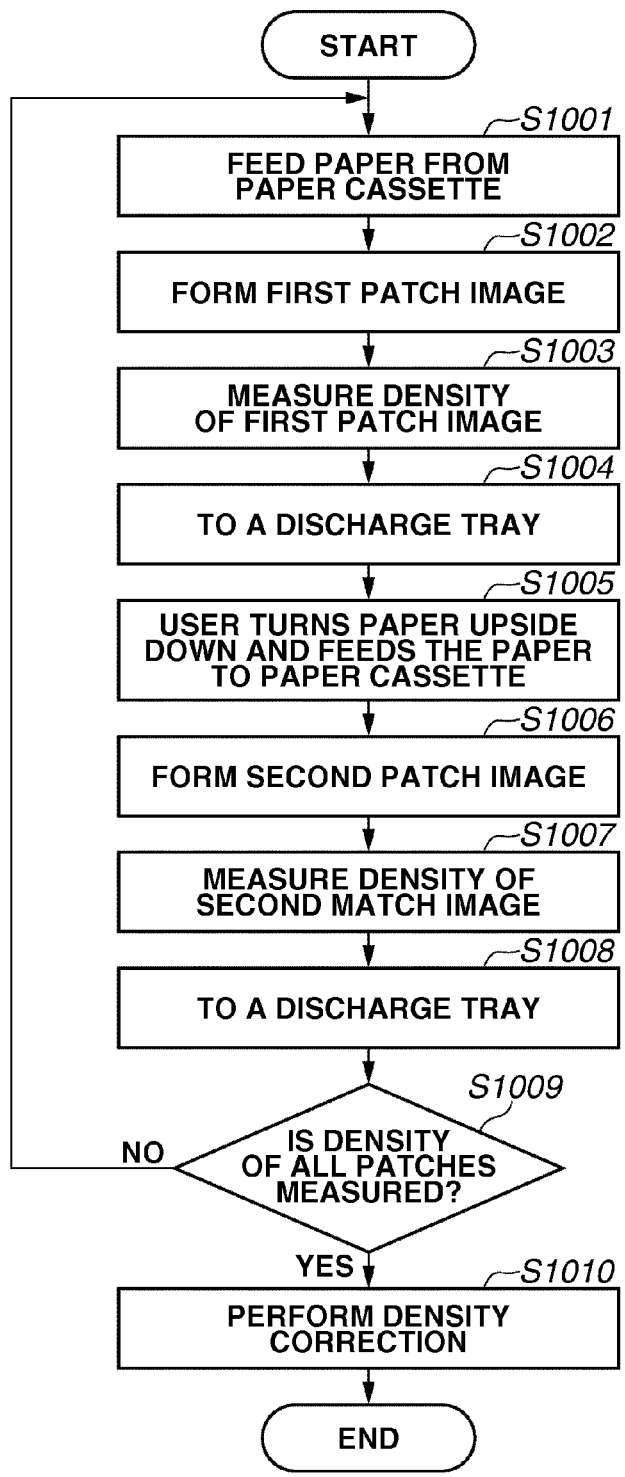
FIG. 10 is a flowchart illustrating a procedure of calibration according to the second exemplary embodiment of the present invention.

FIG. 10 is a flowchart illustrating a flow of controlling multicolor calibration performed in the image forming apparatus having the spectral sensors according to the second exemplary embodiment. Unless specifically mentioned, the flowchart is basically executed by the CPU 51 during intervals between normal print operations. In the first exemplary embodiment, the example of the automatic calibration without instructions by a user is described. In the second exemplary embodiment, the user is required to intentionally perform calibration by manual calibration.

FIG. 11 illustrates a screen displayed on a display unit 58 when the user performs the manual calibration. The medium 11 on which a patch image for the calibration is formed can be fed from the paper cassette 21a or the manual feed tray 21b in FIG. 1. In FIG. 11, when the user presses the test print key, in step S1001, the medium 11 is fed.

Figure 9A:
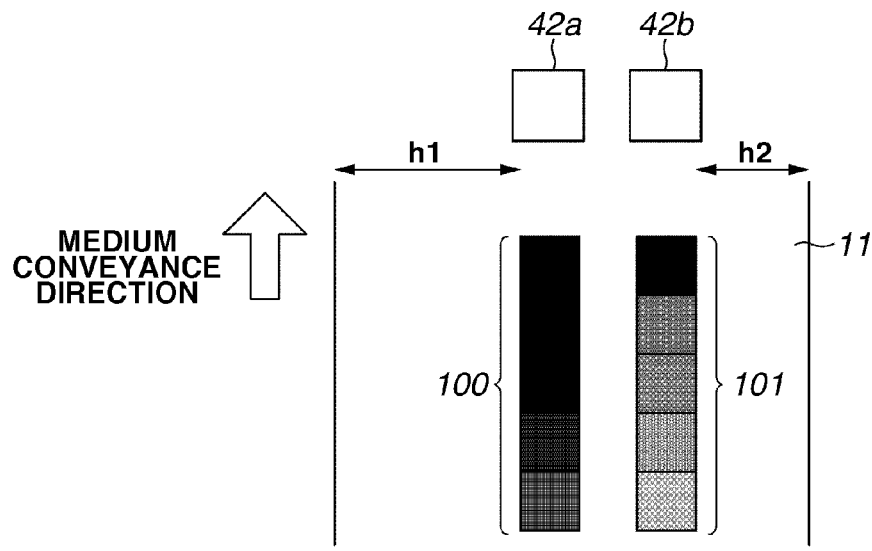
FIG. 9A illustrates first patch images for density-gradation characteristic control formed on a medium according to a second exemplary embodiment of the present invention.
Figure 9B:
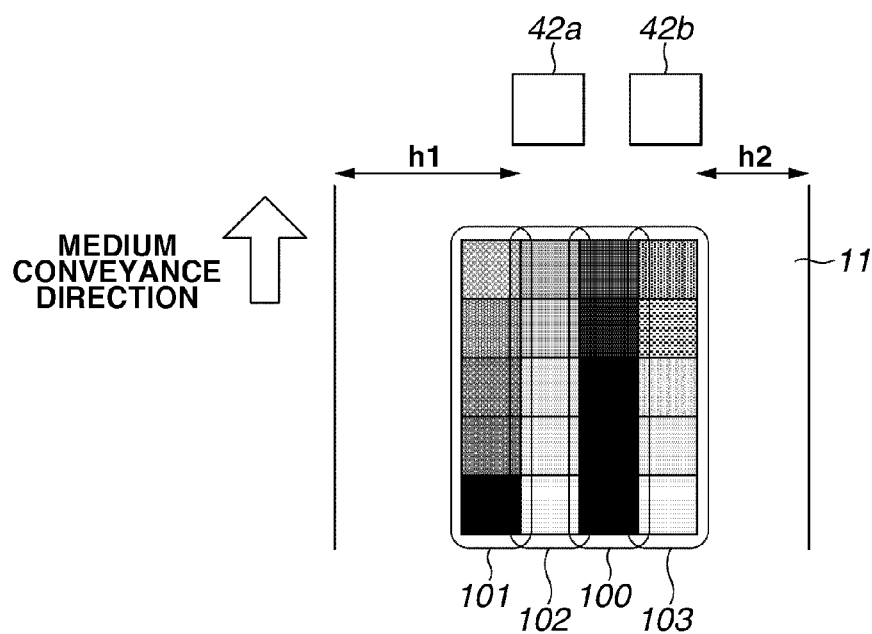
FIG. 9B illustrates second patch images for density-gradation characteristic control formed on the medium according to the second exemplary embodiment of the present invention.

In step S1002, first patch images are formed. FIGS. 9A and 9B illustrate positional relationships between patch images 100 and 101 formed on the medium 11 and the spectral sensors 42a and 42b. FIG. 9A illustrates an example when the first patch images are formed in step S1002. In the second exemplary embodiment, a distance of the spectral sensor 42a from the left end of the medium 11 and a distance of the spectral sensor 42b from the right end of the medium 11 are set to h1 and h2 respectively which are different positions.

The image control unit 50 forms patch images at positions the two spectral sensors 42a and 42b can measure the patch images. Different from the first exemplary embodiment, in the present exemplary embodiment, the density of the patch images is not limited to specific values.

In the flowchart in FIG. 10, in step S1003, the medium 11 is conveyed, and the spectral sensors 42a and 42b measure the first patch images. In the exemplary embodiment, the calibration is executed using a density value of the patch image, which can be acquired from a spectral reflectance. Alternatively, a value calculated from the acquired spectral reflectance can also be used. In step S1004, the reversing rollers 35 rotates in the reverse direction, and the medium 11 is once discharged on the discharge unit 36.

In step S1005, to form the second patch images, the user sets the medium 11 once discharged, to the paper cassette 21a or the manual feed tray 21b. At this time, the direction of the medium 11 need to be set such that the second patch images are formed within the printable region on the medium 11 at positions different from the positions the first patch images are formed. In this case, by displaying an additional image on the display unit 58 or printing the image on the medium 11, support may be given which notifies the user of a direction of the medium 11 feeding.

Figure 12:
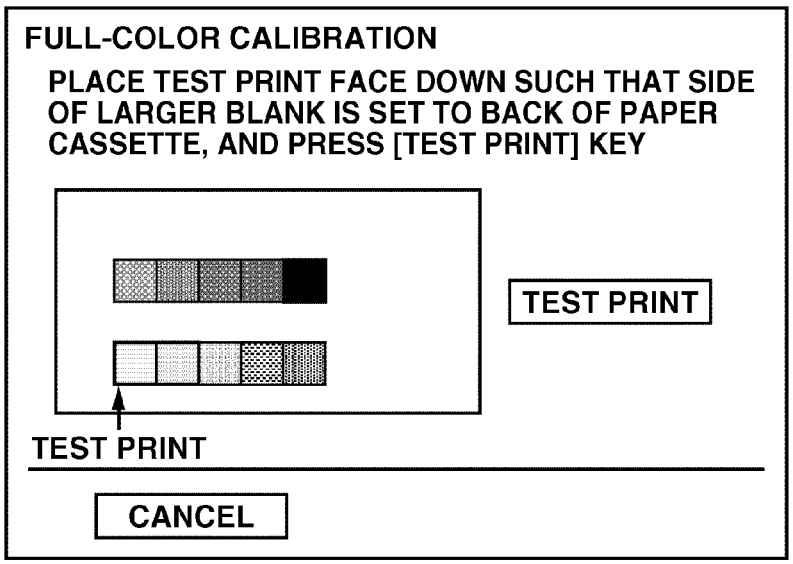
FIG. 12 illustrates a display part for supporting a direction setting of a medium used when a user sets the medium in a paper cassette in the second patch formation according to the second exemplary embodiment of the present invention.
Figure 13:
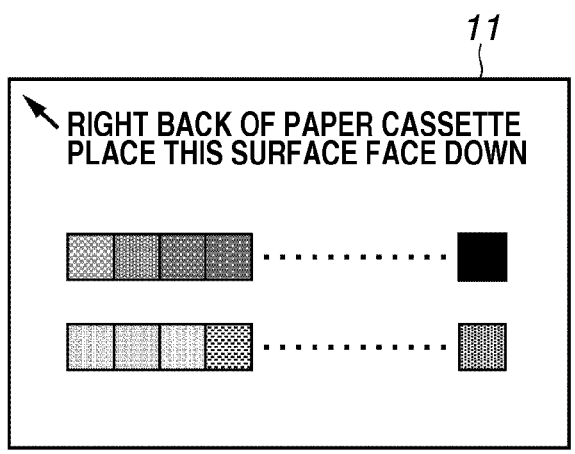
FIG. 13 illustrates a print on a medium for supporting a direction setting of the medium used when a user sets the medium in a paper cassette in the second patch formation according to the second exemplary embodiment of the present invention.

FIG. 12 illustrates the direction of the medium 11 feeding indicated on the display unit 58. As illustrated in FIG. 12, the distances from the ends of the paper of the printed patch images differ from each other; the right and left margins in the paper are different from each other. Accordingly, in the example, the difference indicates the feeding direction of the medium 11. FIG. 13 illustrates the feeding direction of the medium 11 printed in advance so that the user can easily determine the feeding direction of the medium 11 for the second patch image formation at the time of the first patch image formation in step S1002. Thus, the user sees the mark printed on the medium 11 discharged in step S1004 and the user can determine the direction of the medium 11 when the user feeds the medium 11 again for the second patch image formation.

For the user, the support illustrated in FIG. 12 or FIG. 13 is made. The user follows the instruction, and the medium 11 is fed and the second patch images are formed. After that, the screen transfers to the screen illustrated in FIG. 11 again, and when the user presses the test print key again, the image forming unit 20 feeds the medium 11 to form the second patch images.

In step S1006, the second patch images are formed. FIG. 9B illustrates an example when the second patch images are formed in step S1006. As illustrated in FIG. 9B, the second patches 102 and 103 are formed within the same region as the first image formation, and similar to the first image formation, at the distance of h1 from the left end of the medium 11, and the distance of h2 from the right end respectively. However, since in step S1005, the user feeds the medium 11 again in the direction the medium 11 was turned upside down, the print positions of the patch images formed in the second image formation are different from those formed in the first image formation.

In step S1007, similarly to the first image formation, the second patch images are measured. In step S1008, the medium 11 is discharged onto the discharge unit 36. The control flow after this step is similar to that in the first exemplary embodiment, and accordingly, its description is omitted.

As described above, in the present exemplary embodiment, the patch images are formed a plurality of times by controlling the display screen such that the direction of the medium 11 on which the patch images are formed and discharged once is turned upside down and the medium 11 is fed again. As a result, the second patch images are formed at positions different from the positions the first patch images are formed. Consequently, in one sheet of the medium 11, two sheets of patch images are formed, and the formed patch images can be measured. If the present exemplary embodiment is employed, the operation by the user is required. However, the patch arrangement can be implemented without the effects of the show-through of the front and back patch images in measuring the patch images on the back surface.

In the present exemplary embodiment, sensing errors due to the show-through of the front and back patch images can be reduced when the patch images on the back surface are measured by the spectral sensors 42, without adding a new mechanism to the apparatus or performing complex control. Further, the number of sheets necessary for printing the patch images can be reduced.

A third exemplary embodiment of the present invention is described. In the third exemplary embodiment, the methods described in the first exemplary embodiment and the second exemplary embodiment are automatically switched to one another depending on a mode of calibration. Descriptions of the parts similar to those in the above-described exemplary embodiments are omitted.

Figure 14:
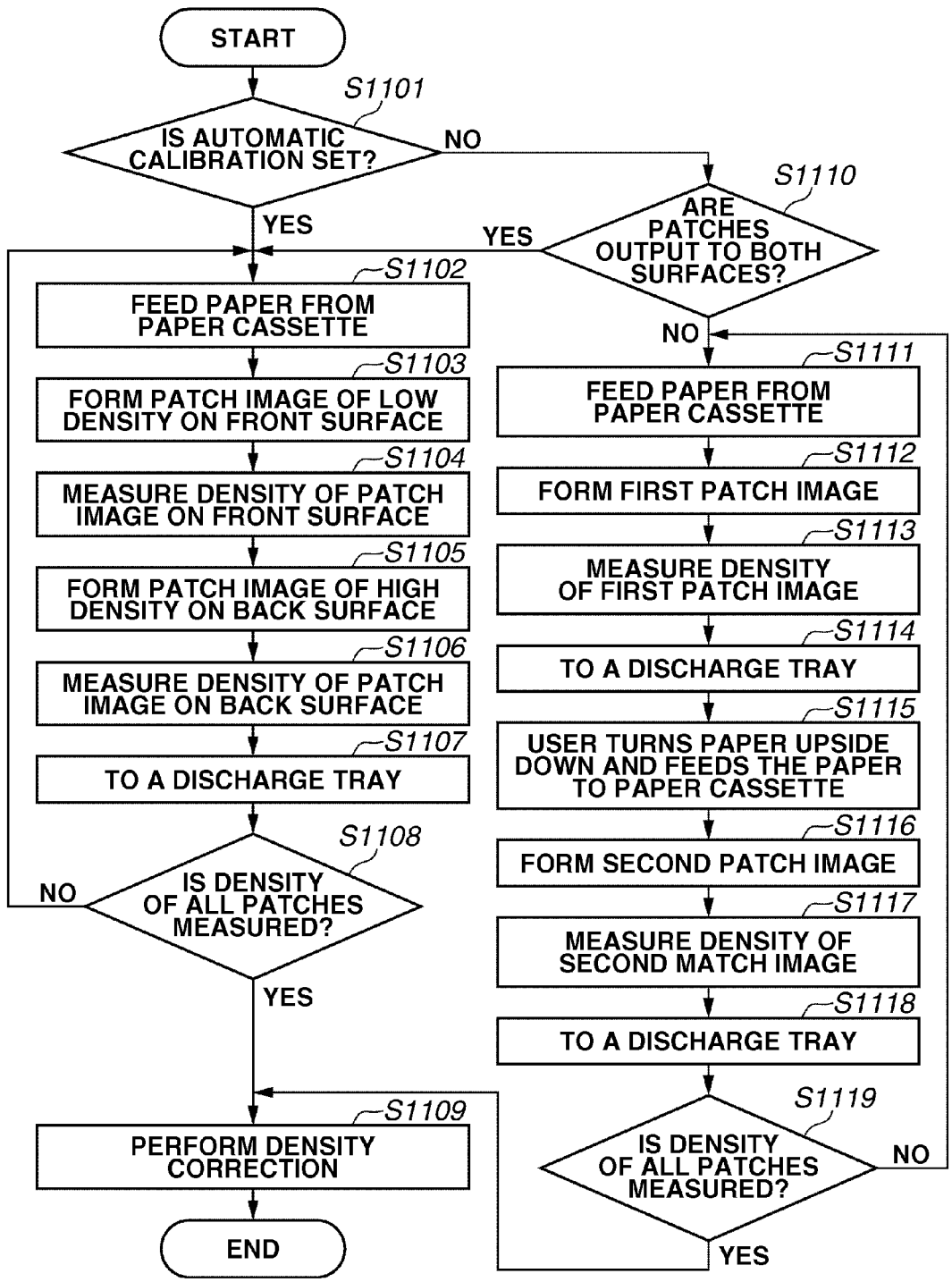
FIG. 14 is a flowchart illustrating a procedure of calibration according to a third exemplary embodiment of the present invention.

FIG. 14 is a flowchart illustrating a control flow of multicolor calibration performed in the image forming apparatus having the spectral sensors according to the third exemplary embodiment. Unless specifically mentioned, the flowchart is basically executed by the CPU 51 during intervals between normal print operations. As described above, in executing the calibration of the image forming apparatus 10 according to the exemplary embodiment, the two modes of the automatic calibration and the manual calibration are provided. These calibration modes can be set to a mode desired by the user operating the operation unit 57.

In step S1101, if the automatic calibration is selected (YES in step S1101), the CPU 51 automatically performs the calibration processing without requiring the operation by the user, and consequently, the calibration method described in the first exemplary embodiment is automatically selected. The control flow performed after step S1102 is similar to that described in the first exemplary embodiment, and accordingly, its description is omitted. In step S1101, if the manual calibration is selected (NO in step S1101), the user can intentionally execute the calibration. Consequently, in step S1110, since both of the calibration method described in the first exemplary embodiment and the calibration method described in the second exemplary embodiment can be selected, the user can select one of the two. FIG. 15 illustrates a screen displayed on the display unit 58 in this step.

In step S1110, if the user selects the "print patch images on both sides of paper" mode (YES in step S1110), the calibration method described in the first exemplary embodiment is executed. In step S1110, if the user selects the "print patch images by shifting the images" mode (NO in step S1110), the calibration method described in the second exemplary embodiment is selected. The control flows performed after the step S1110 are similar to the control flows described in the first and second exemplary embodiments, and accordingly, their descriptions are omitted.

In addition, for a user who is not required to reduce the number of sheets for printing the patch images, a method of forming patch images on only one side of the medium 11 may be selected without forming patch images on both sides of the medium 11 or without shifting patch images. In such a case, the number of sheets for printing the patch images is not reduced.

As described above, according to the present exemplary embodiment, depending on whether the calibration mode is set to automatic or manual, the patch image forming methods are switched over. Thus, the convenience of the user in executing the calibration can be increased.

The fourth exemplary embodiment of the present invention is described. The fourth exemplary embodiment is similar to the third exemplary embodiment in many aspects, however, there is a difference that the print method of patch images is switched by the type of the medium 11 to be used instead of by the calibration modes.

Figure 16:
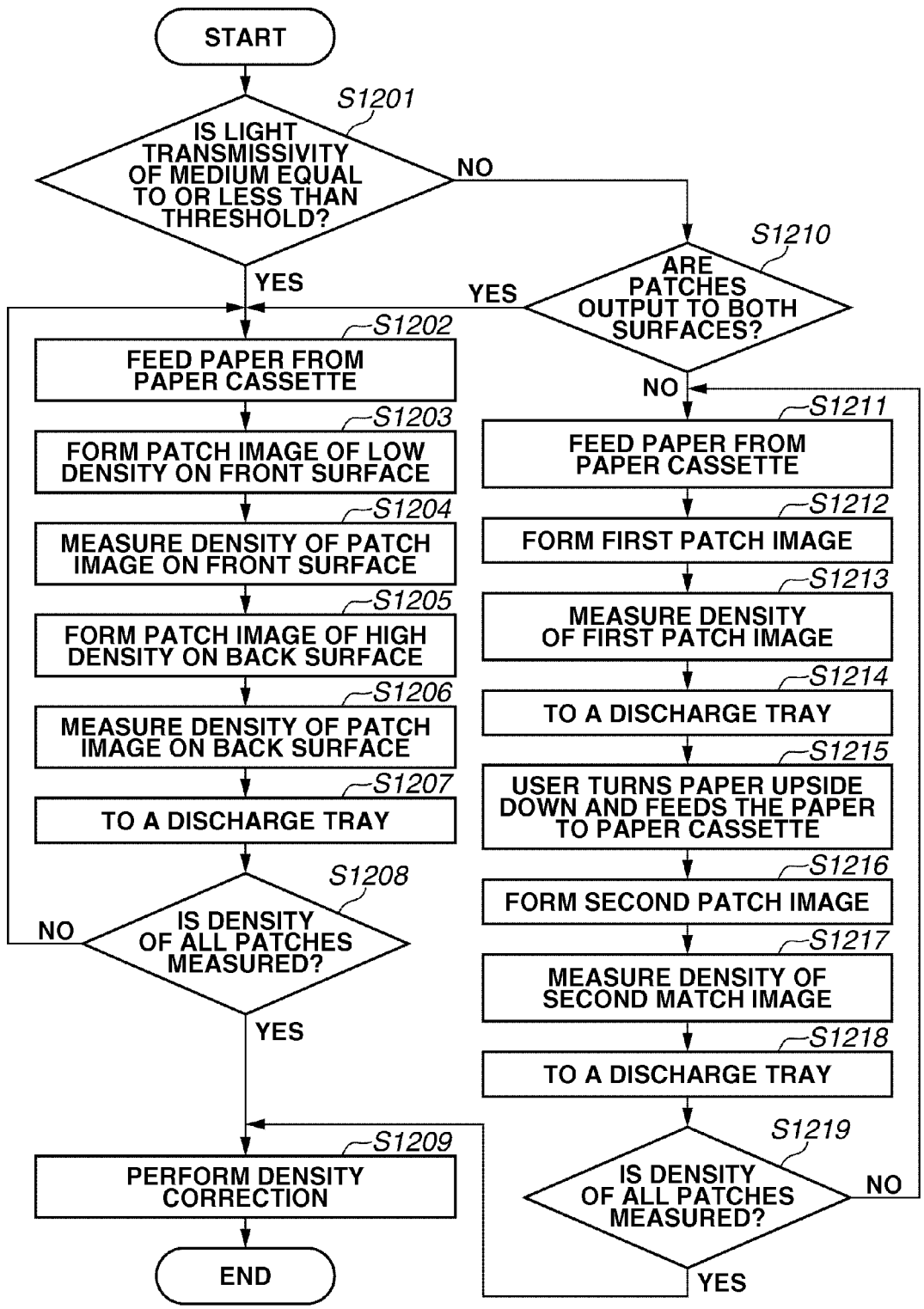
FIG. 16 is a flowchart illustrating a procedure of calibration according to a fourth exemplary embodiment of the present invention.

FIG. 16 is a flowchart illustrating a control flow of multi-color calibration performed in the image forming apparatus having the spectral sensors according to the fourth exemplary embodiment. Unless specifically mentioned, the flowchart is basically executed by the CPU 51 during intervals between normal print operations. Normally, when the medium 11 other than plain paper is used, before the user feeds the medium 11, the user sets the type of the medium 11 to be used via the operation unit 57. The medium 11 other than the plain paper includes thick paper, coated paper, and OHP sheets. Depending on the type of the paper, the light transmissivity of the medium differs. The types of the paper and their light transmissivity are registered in the ROM 52, or the like in advance.

In step S1201, if the medium selected by the user has a light transmissivity lower than a predetermined threshold such as thick paper (YES in step S1201), the CPU 51 determines that no effect of the show-through of the front and back patch images exists, and the calibration method described in the first exemplary embodiment is automatically selected. This is because if it is assumed that no effect of the show-through of the front and back images due to overlapping patch images exists, it is desirable that the patches are formed on both surfaces and the calibration is automatically performed without instructions by the user.

On the other hand, if the medium 11 selected by the user has a light transmissivity higher than the predetermined threshold (NO in step S1201), it cannot be said that no effect of the show-through of the front and back images due to overlapping patch images exists even if the calibration method described in the first exemplary embodiment is selected. Consequently, in step S1210, the user can select one of the two calibration method described in the first exemplary embodiment or the calibration method described in the second exemplary embodiment. The control flows performed after the step S1210 are similar to the control flows described in the first and second exemplary embodiments, and accordingly, their descriptions are omitted.

If the user selects, for example, coated paper, high-quality paper, or the like, more accurate multicolor calibration is required. Consequently, in this case, the total number of patches may be increased.

As described above, according to the exemplary embodiment, depending on the type of the medium 11 selected by the user, the patch image forming methods are switched over. Therefore, an appropriate patch image formation method can be selected without considering the light transmissivity of the type of the medium 11 when the user executes the calibration.

A fifth exemplary embodiment of the present invention is described. In the fifth exemplary embodiment, the total number of patch images printable on one sheet of the medium 11 can be further increased by combining the patch image formation methods in the first and second exemplary embodiments.

Figure 17:
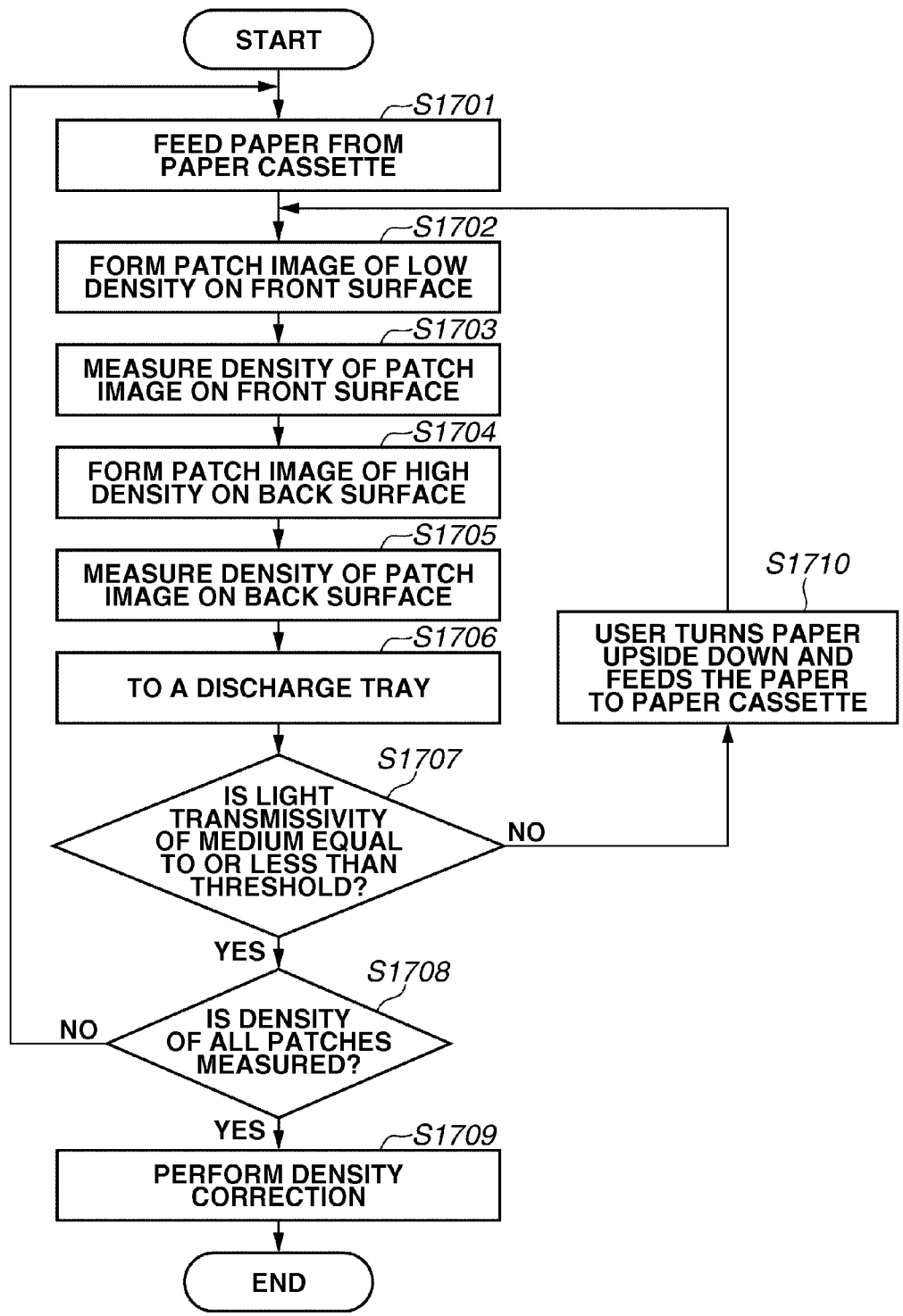
FIG. 17 is a flowchart illustrating a procedure of calibration according to a fifth exemplary embodiment of the present invention.

FIG. 17 is a flowchart illustrating a control flow of multi-color calibration performed in the image forming apparatus having the spectral sensors according to the fifth exemplary embodiment. Unless specifically mentioned, the flowchart is basically executed by the CPU 51 during intervals between normal print operations. The control flow from step S1701 to step S1706 is similar to that in the first exemplary embodiment, therefore, the description is omitted.

In step S1707, the CPU 51 determines whether the medium 11 is discharged onto the discharge unit 36 for the first time or the second time. In step S1707, if the medium 11 is the medium discharged for the first time (NO in step S1707), as described in the second exemplary embodiment, in step S1710, the user turns the medium 11 upside down and feeds the medium 11 again. Then, the processing proceeds to step S1702, and a similar operation is repeated again.

In step S1707, if the medium 11 is discharged for the second time (YES in step S1707), in step S1708, the CPU 51 determines whether measurement of all patches is completed. In step S1708, if the measurement of all patches is completed (YES in step S1708), in step S1709, the CPU 51 corrects the density of CMYK using a calibration table for correcting the density-gradation characteristic. On the other hand, in step S1708, if not all of the patch images are measured (NO in step S1708), the processing returns to step S1701 again. In step S1701, the medium 11 is fed from the paper feed cassette 21a, and a similar flow is repeated.

As described above, according to the present exemplary embodiment, by combining the first and second exemplary embodiments, the patch images are formed on the both sides, and by turning the medium 11 upside down and feeding the medium 11, the patch images can be further shifted. Thus, as compared to the first and second exemplary embodiments, the number of patch images printable on one sheet of the medium 11 can be further increased, and the number of sheets necessary for printing the patch images can be reduced.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-146501 filed Jun. 30, 2011, which is hereby incorporated by reference herein in its entirety.

What is claimed is:

1. An image forming apparatus comprising:
a formation unit configured to form patch images to be used for calibration of an output image;
a detection unit disposed on a paper conveyance path and configured to detect the fixed patch images formed on paper by the formation unit; and
a correction unit configured to perform the calibration of the output image using the patch images detected by the detection unit,
wherein when the formation unit forms the patch images, the formation unit controls the arrangement of the patch images such that, after the patch image is formed on the first paper surface and the detection unit detects the patch image, the patch image formed on a second surface that is the back surface of a first surface, is detected by the detection unit, suppressing show-through effects of the front and back images, by forming on the second surface the patch image having a density higher than the patch image formed on the first surface.

2. The image forming apparatus according to claim 1, wherein the patch formed on the first surface of the paper has a density lower than or equal to a predetermined threshold.

3. The image forming apparatus according to claim 2, wherein the predetermined threshold is determined by a thickness of the paper on which the patches are formed.

4. The image forming apparatus according to claim 1, wherein in a case where it is determined that a thickness of the paper on which the patches are formed by the formation unit is greater than a threshold, when the formation unit forms the patch images, after the patch image is formed on the first paper surface and the detection unit detects the patch image, the formation unit controls the arrangement of the patch images such that the patch image formed on the second surface that is the back surface of the first paper surface is detected by the detection unit, suppressing show-through effects of the front and back images, by forming on the second surface the patch image having the density higher than the patch image formed on the first surface.

5. The image forming apparatus according to claim 1, wherein the detection unit is disposed on a two-sided conveyance path.

6. An image forming method of an image forming apparatus having a detection unit disposed on a paper conveyance path and configured to detect fixed patch images formed on paper, the image forming method comprising:
forming patch images to be used for calibration of an output image; and
correcting by performing the calibration of the output image using the patch images detected by the detection unit,
wherein in forming the patch images, after the patch image is formed on a first surface of the paper and the patch is detected by the detection unit, performing control of the arrangement of the patch images such that the patch image formed on a second surface that is the back surface of the first surface is detected by the detection unit, suppressing show-through effects of the front and back images, by forming on the second surface the patch image having a density higher than the patch image formed on the first surface.

7. A non-transitory computer-readable medium storing a program for instructing a computer to execute the image forming method described in claim 6.

* * * * *